(12) United States Patent
Hustin

(10) Patent No.: US 11,353,565 B2
(45) Date of Patent: Jun. 7, 2022

(54) TIME-OF-FLIGHT IMAGING APPARATUS AND METHOD

(71) Applicant: Sony Semiconductor Solutions Corporation, Kanagawa (JP)

(72) Inventor: Serge Hustin, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 398 days.

(21) Appl. No.: 16/465,304

(22) PCT Filed: Dec. 7, 2017

(86) PCT No.: PCT/EP2017/081856
§ 371 (c)(1),
(2) Date: May 30, 2019

(87) PCT Pub. No.: WO2018/104464
PCT Pub. Date: Jun. 14, 2018

(65) Prior Publication Data
US 2019/0346542 A1    Nov. 14, 2019

(30) Foreign Application Priority Data
Dec. 7, 2016 (EP) ..................... 16202730

(51) Int. Cl.
*G01S 7/4915* (2020.01)
*G01S 17/36* (2006.01)

(52) U.S. Cl.
CPC ............ *G01S 7/4915* (2013.01); *G01S 17/36* (2013.01)

(58) Field of Classification Search
CPC ................................ G01S 17/36; G01S 7/4915

USPC ........................................................ 702/159
See application file for complete search history.

(56) References Cited

U.S. PATENT DOCUMENTS

| 6,404,535 | B1* | 6/2002 | Leight | G06E 3/005 |
| | | | | 359/306 |
| 6,777,659 | B1 | 8/2004 | Schwarte | |
| 2008/0036996 | A1 | 2/2008 | O'Connor et al. | |
| 2011/0097078 | A1* | 4/2011 | Eliyahu | G01R 31/2824 |
| | | | | 398/25 |
| 2011/0292370 | A1 | 12/2011 | Hills et al. | |

(Continued)

FOREIGN PATENT DOCUMENTS

| DE | 10 2012 204512 A1 | 9/2013 |
| EP | 2 894 492 A1 | 7/2015 |
| JP | 2011520116 A | 7/2011 |

OTHER PUBLICATIONS

International Search Report and Written Opinion for International Application No. PCT/EP2017/081856 dated Mar. 6, 2018.

(Continued)

*Primary Examiner* — Aditya S Bhat
(74) *Attorney, Agent, or Firm* — Wolf, Greenfield & Sacks, P.C.

(57) ABSTRACT

Apparatus including circuitry configured to: acquire correlation signals by correlating a photodetected signal with respective phase-shifted reference signals, the correlation signals comprising quadrature correlation signals and in-phase correlation signals. The circuitry is configured in such a way that the mean time of acquisition of the quadrature correlation signals and the mean time of acquisition of the in-phase correlation signals are substantially equal.

18 Claims, 8 Drawing Sheets

(56) References Cited

U.S. PATENT DOCUMENTS

| | | |
|---|---|---|
| 2012/0176476 A1 | 7/2012 | Schmidt et al. |
| 2013/0177236 A1 | 7/2013 | Kim et al. |
| 2013/0221211 A1* | 8/2013 | Witzens .............. H04B 10/67 250/227.11 |
| 2013/0301908 A1 | 11/2013 | Shim et al. |
| 2014/0043598 A1 | 2/2014 | Bamji et al. |

OTHER PUBLICATIONS

Foix et al., Lock-in Time-of-Flight (ToF) Cameras: A Survey. IEEE Sensors Journal. 2011;11(3). 11 pages.

Gokturk et al., A Time-of-Flight Depth Sensor—System Description, Issues and Solutions. 2004. 9 pages.

Lee. Depth Camera Image Processing and Applications. Samsung Advanced Institute of Technology. IEEE ICIP 2012. 4 pages.

\* cited by examiner

TIME-OF-FLIGHT IMAGING APPARATUS AND METHOD

CROSS REFERENCE TO RELATED APPLICATIONS

This application claims the benefit under 35 U.S.C. § 371 as a U.S. National Stage Entry of International Application No. PCT/EP2017/081856, filed in the European Patent Office as a Receiving Office on Dec. 7, 2017, which claims priority to European Patent Application Number 16202730.4, filed in the European Patent Office on Dec. 7, 2016, each of which is hereby incorporated by reference in its entirety.

TECHNICAL FIELD

The present disclosure generally pertains to Time-of-Flight imaging apparatus and methods.

TECHNICAL BACKGROUND

Time-of-Flight (ToF) 3D imaging apparatus are known for providing information concerning the distance to an object by an analysis of the Time-of-Flight from a light source to the object and back. ToF 3D imaging devices (or 3D ToF cameras) rely on the ToF principle which requires a plurality of subsequent measurements as from which depth computations are performed to estimate real distance of objects from a camera. Each measurement has its own integration time and the period of time during which the plurality of measurements required to determine a depthmap also has a determined duration.

ToF cameras compute 3D images or depthmaps from sets of subsequent acquisitions/measurements taken according to the ToF principle (shown in FIG. 1 and explained hereafter). When objects within the scene move during the complete set of subsequent measurements (or if the camera moves within the scene and with respect to the objects in a way making the distances change over the time), a negative impact on the computed depth may occur as each subsequent measurement at each pixel will not correspond to the same part of the scene, and the computed depth measurement extracted from the said subsequent measurement according to the ToF principle will provide inaccurate depth estimates (called motion blur in 2D imaging).

In order to determine the distance of objects from a camera, a photodetected signal is usually correlated with four electrical reference signals that are shifted by 0°, 180°, 90° and 270° respectively, compared to the original optical signal. The acquisition should be adapted to minimize the error introduced in the depth computation for a scene wherein a dynamic aspect is involved (i.e. motion of the camera or of the scene/objects). The sequences of correlation measurements in the state of the art have been set as follows: a first set of a 0° and then of a 90° correlation measurements is taken subsequently, and then a second set of a 180° and then of a 270° correlation measurements is taken subsequently. In order to decrease the impact of camera movement or scene changes when the four correlations are measured, one tried to reduce the errors caused by changes in the scene ("motion blur") by measuring the four correlations as fast as possible, or one would use additional signal processing to identify the regions in which motion blur had occurred.

Although there exist such techniques for decreasing the impact of camera movement or scene changes, it is generally desirable to provide solutions that are more efficient in decreasing the impact of camera movement or scene changes.

SUMMARY

According to a first aspect the disclosure provides an apparatus comprising circuitry configured to: acquire correlation signals by correlating a photodetected signal with respective phase-shifted reference signals, the correlation signals comprising quadrature correlation signals and in-phase correlation signals, wherein the circuitry is configured in such a way that the mean time of acquisition of the quadrature correlation signals and the mean time of acquisition of the in-phase correlation signals is substantially equal.

According to a further aspect the disclosure provides an apparatus comprising circuitry configured to: acquire correlation signals by correlating a photodetected signal with respective phase-shifted reference signals, the correlation signals comprising a first set of correlation signals and a second set of correlation signals, wherein the circuitry is configured in such a way that the average phase of the first set of correlation signals and the average phase of the second set of correlation signals are orthogonal or substantially orthogonal to each other, and wherein the circuitry is configured in such a way that the mean time of acquisition of the first set of correlation signals and the mean time of acquisition of the second set of correlation signals are equal or substantially equal.

According to a further aspect the disclosure provides a method comprising acquiring correlation signals by correlating a photodetected signal with respective phase-shifted reference signals, the correlation signals comprising quadrature correlation signals and in-phase correlation signals, wherein the acquiring of the correlation signals is performed in such a way that the mean time of acquisition of the quadrature correlation signals and the mean time of acquisition of the in-phase correlation signals is substantially equal.

According to a further aspect the disclosure provides a method comprising: acquiring correlation signals by correlating a photodetected signal with respective phase-shifted reference signals, the correlation signals comprising a first set of correlation signals and a second set of correlation signals, wherein the average phase of the first set of correlation signals and the average phase of the second set of correlation signals are orthogonal or substantially orthogonal to each other, and wherein the mean time of acquisition of the first set of correlation signals and the mean time of acquisition of the second set of correlation signals are equal or substantially equal.

Further aspects are set forth in the dependent claims, the following description and the drawings.

Before explaining embodiments of the disclosure in more detail with reference to the drawings, some general explanations are made.

Circuitry may be any kind of electronic circuitry, comprising integrated circuitry such a microchips, a processing unit such as a CPU, LED and/or laser driver electronics, or the like.

A photodetected signal may for example correspond to light that is obtained by a camera sensor of a ToF camera. For example, in ToF imaging, a photodetected signal may correspond to light that is reflected from a scene that is illuminated with modulated light.

The photodetected signal may be obtained by a ToF camera system that resolves distance based on the known speed of light, measuring the Time-of-Flight of a modulated light signal between the camera and the subject for each point of the image. Various technologies for Time-of-Flight cameras may be used in the context of the embodiments, for example RF-modulated light sources with phase detectors, or range gated imagers. The reflected light may for example be captured by a sensor which comprises a pixel array, where a single pixel consists of a photo sensitive element (e.g. a photo diode) that converts the incoming light into a current.

In ToF imaging, a reference signal is for example correlated with a photodetected signal to generate a correlation signal. The reference signal may be an electric reference signal, or the like. According to some embodiments, the reference signals are electric reference signals that are phase-shifted by 0°, 180°, 90° and 270° respectively, compared to a modulated light signal.

Quadrature correlations may for example relate to reference signals that are phase-shifted by 90° or substantially 90°, or 270° or substantially 270°, whereas in-phase correlation may for example relate to reference signals that are phase-shifted by 0° or 180° or substantially 0° or substantially 180°.

According to the embodiments, the mean time of acquisition of the quadrature correlation signals and the mean time of acquisition of the in-phase correlation signals is substantially equal. If the mean time of acquisition of the quadrature correlation signals and the mean time of acquisition of the in-phase correlation signals is substantially equal this may result in that the mean time of acquisition of correlations used in a numerator of an equation that describes the phase-shift angle between a modulated light signal and a photodetected signal, and the mean time of acquisition of correlations in the denominator of the equation that describes this phase-shift angle is substantially equal. That is, if the mean time of acquisition of the quadrature correlation signals and the mean time of acquisition of the in-phase correlation signals is substantially equal, this may result in that the phase offset error that results in motion blur is significantly reduced.

According to some embodiments, the correlation signals are quadrature modulation signals and the circuitry is configured to acquire a first and a last correlation signal on 180° opposing phase, and a second and third correlation signal also on 180° opposing phase.

According to some embodiments, the first and a last correlation signal are quadrature correlation signals, whereas the second and third correlation signals are in-phase correlation signals.

According to yet other embodiments, the first and a last correlation signal are in-phase correlation signals, whereas the second and third correlation signals are quadrature correlation signals.

According to some embodiments, the circuitry is configured to first acquire subsequently a first set of 0° and then of 180° correlation measurements, and then acquire subsequently a second set of 90° and then of 270° correlation measurements.

According to some embodiments, the circuitry is configured to: acquire a 0° correlation signal at a first time $T_0$, acquire a 90° correlation signal at a second time $T_0+\Delta T$, acquire a 270° correlation signal at a third time $T_0+2\cdot\Delta T$, and acquire a 180° correlation signal at a last time $T_0+3\cdot\Delta T$, where $T_0$ is a time when the acquisition of the correlation signals starts, and where $\Delta T$ is a predefined time interval.

According to some embodiments, the circuitry is configured to acquire the correlation signals according to alternative phase-shift sequences.

For example, all phases of the correlation signals may be shifted by the same predefined phase angle without departing from the general concept described in this application.

That is, for example, the circuitry may also be configured to acquire correlation signals by correlating a photodetected signal with respective phase-shifted reference signals, the correlation signals comprising a first set of correlation signals and a second set of correlation signals, wherein the circuitry is configured in such a way that the average phase of the first set of correlation signals and the average phase of the second set of correlation signals are orthogonal or substantially orthogonal to each other, and wherein the circuitry is configured in such a way that the mean time of acquisition of the first set of correlation signals and the mean time of acquisition of the second set of correlation signals are equal or substantially equal.

In particular, the first set of correlation signals may comprise quadrature modulation signals that are phase-shifted by a predefined phase angle and the second set of correlation signals may comprise in-phase correlation signals that are phase-shifted by the same predefined phase angle.

For example, the first set of correlation signals may comprise quadrature modulation signals and the second set of correlation signal may comprise in-phase correlation signals that are phase-shifted by an arbitrary phase angle.

The apparatus may further comprise an illumination unit for illuminating a scene with a modulated light signal. The illumination unit may for example be a light emitting diode (LED), in particular a laser diode, or the like.

The apparatus may further comprise an imaging sensor for receiving the photodetected signal. The sensor may for example comprise a CCD pixel array.

A method according to the embodiments may for example comprise acquiring correlation signals by correlating a photodetected signal with respective phase-shifted reference signals, the correlation signals comprising quadrature correlation signals and in-phase correlation signals, wherein the acquiring the correlation signals is performed in such a way that the mean time of acquisition of the quadrature correlation signals and the mean time of acquisition of the in-phase correlation signals are substantially equal.

BRIEF DESCRIPTION OF THE DRAWINGS

Embodiments are explained by way of example with respect to the accompanying drawings, in which.

DETAILED DESCRIPTION OF EMBODIMENTS

Figure 1:
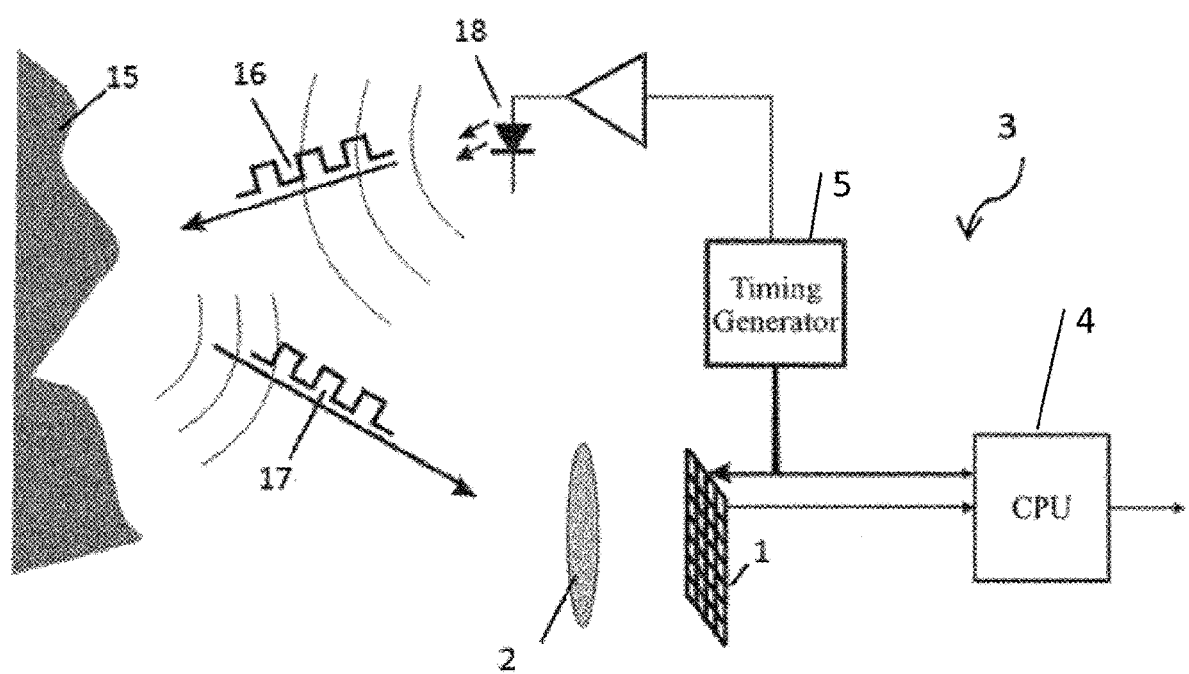
FIG. 1 schematically depicts the basic operational principle of a ToF camera.

FIG. 1 schematically illustrates the basic operational principle of a ToF camera 3. The ToF camera 3 captures 3D images of a scene 15 by analyzing the Time-of-Flight of light from a dedicated illumination unit 18 to an object. The ToF camera 3 includes a camera, for instance a 3D sensor 1 and a processor 4. A scene 15 is actively illuminated with a modulated light 16 at a predetermined wavelength using the dedicated illumination unit 18, for instance with some light pulses of at least one predetermined frequency generated by a timing generator 5. The modulated light 16 is reflected back from objects within the scene 15. A lens 2 collects the reflected light 17 and forms an image of the objects onto the imaging sensor 1 of the camera. Depending on the distance of objects from the camera, a delay is experienced between the emission of the modulated light 16, e.g. the so-called light pulses, and the reception at the camera of those reflected light pulses 17. Distances between reflecting objects and the camera may be determined as function of the time delay observed and the speed of light constant value.

The distance of objects from the camera can be calculated as follows.

Figure 2:
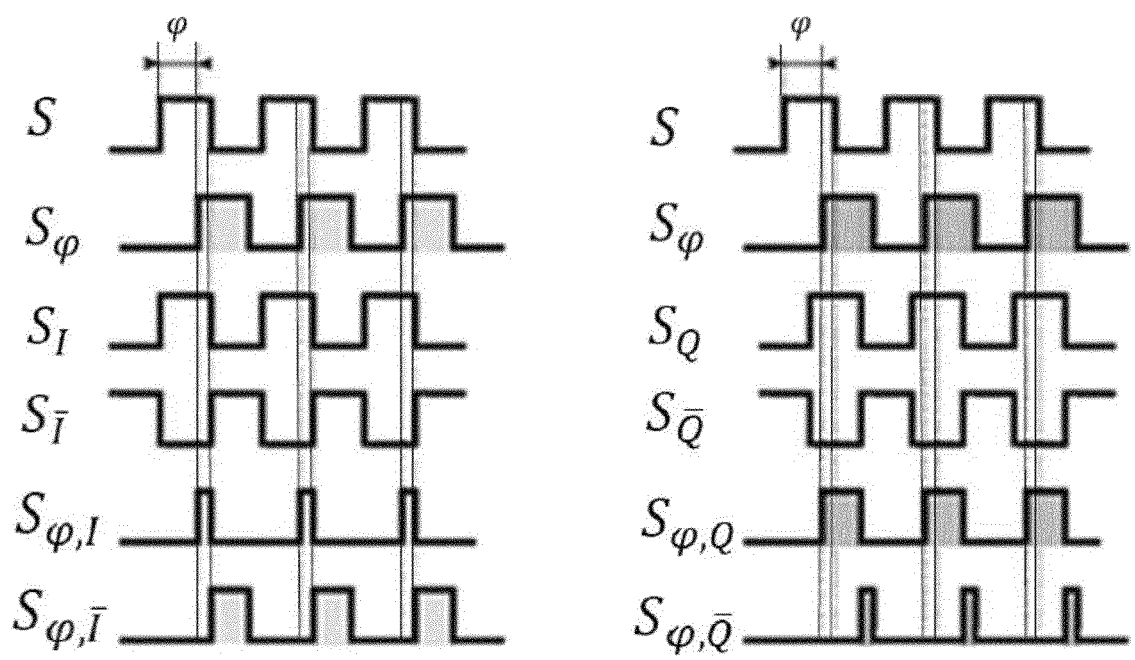
FIG. 2 provides an example of signals involved in a Time-of-Flight measurement.

FIG. 2 shows an example of signals involved in a Time-of-Flight measurement. A modulation signal S (16 in FIG. 1) is sent towards an object. After reflection on the object, a signal $S_\varphi$ is detected by a photodetector that receives reflected light (17 in FIG. 1). This signal $S_\varphi$ is phase-shifted by a phase p compared to the original signal S, due to the travelling time. For instance, if the signal S is a sinusoidal wave of the form:

$$S = A \cos(2\pi ft) \quad \text{(eq. 1)}$$

then, $S_\varphi$ can be seen as a phase-shifted wave with the following mathematical form:

$$S_\varphi = A \cos(2\pi ft + \varphi) = A \cos(2\pi ft)\cos(\varphi) - A \sin(2\pi ft)\sin(\varphi). \quad \text{(eq. 2)}$$

By defining the so-called in-phase I and quadrature Q components by:

$$I = A \cos(\varphi) \text{ and } Q = A \sin(\varphi) \quad \text{(eq. 3,4)}$$

then $S_\varphi$ can be written as $$S_\varphi = I \cos(2\pi ft) - Q \sin(2\pi ft). \quad \text{(eq. 5)}$$

Figure 3:
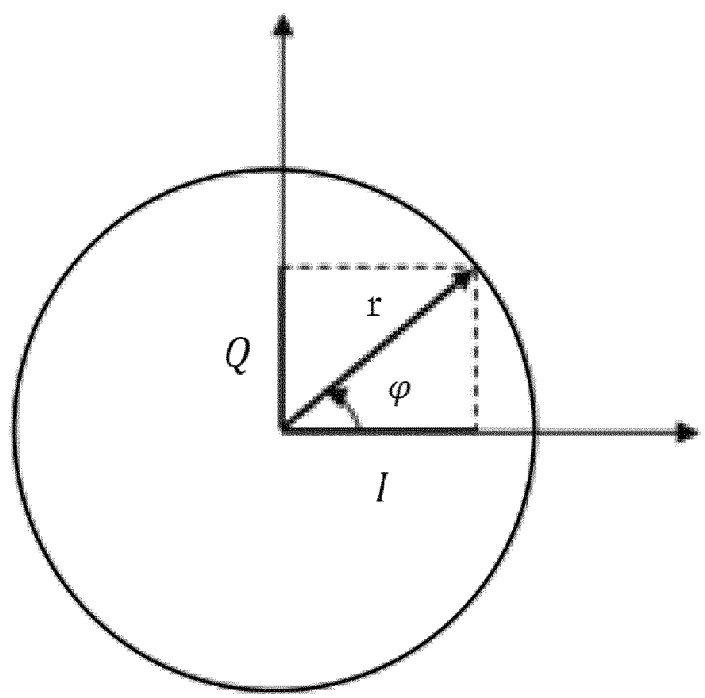
FIG. 3 represents the photodetected signal $S_\varphi$ in its polar form.

This equation enables representing $S_\varphi$ in its polar form, as a vector, represented in FIG. 3, with $\varphi$ being the phase of $S_\varphi$ and r being a parameter corresponding to the amplitude A of the signal $S_\varphi$ and being also related to the so-called confidence. $\varphi$, I and Q are key parameters for measuring the distance of objects from a camera. To measure these parameters, the photodetected signal $S_\varphi$ is usually correlated with electrical reference signals named $S_I$, $S_{\overline{I}}$, $S_Q$ and $S_{\overline{Q}}$. $S_I$, $S_{\overline{I}}$, $S_Q$ and $S_{\overline{Q}}$ are electrical reference signals shifted by 0°, 180°, 90° and 270° respectively, compared to the original optical signal S, as illustrated in FIG. 2. The correlation signals obtained are defined as follows:

$$S_{\varphi,I} = S_\varphi \cdot S_I$$

$$S_{\varphi,\overline{I}} = S_\varphi \cdot S_{\overline{I}}$$

$$S_{\varphi,Q} = S_\varphi \cdot S_Q$$

$$S_{\varphi,\overline{Q}} = S_\varphi \cdot S_{\overline{Q}}. \quad \text{(eq. 6-9)}$$

Then, the two parameters I and Q can be calculated such that:

$$I = A_S \cdot \alpha \cdot (S_{\varphi,I} - S_{\varphi,\overline{I}}) \text{ and}$$

$$Q = A_S \cdot \alpha \cdot (S_{\varphi,Q} - S_{\varphi,\overline{Q}}). \quad \text{(eq. 10-11)}$$

$A_S$ and $\alpha$ are, respectively, the amplitude change of the photodetected signal $S_\varphi$ and the efficiency of the correlation, which both are measured during operation.

The extraction of $\varphi$ depends on the shape of the modulation signal S. For example, if S is a sine wave, then $$\varphi = \begin{cases} \arctan\dfrac{Q}{I} & \text{if } I, Q \geq 0 \\ \arctan\dfrac{Q}{I} + \pi & \text{if } I < 0 \\ \arctan\dfrac{Q}{I} + 2\pi & \text{if } Q < 0, I \geq 0 \end{cases} \quad \text{(eq. 12-14)}$$

Once the phase $\varphi$ is known, the distance $D_\varphi$ of objects from a camera can be retrieved according to the following formula:

$$D_\varphi = \dfrac{c \cdot (\varphi + 2\pi \cdot n)}{4\pi \cdot f_{mod}} \quad \text{(eq. 15)}$$

where c is the speed of light, $f_{mod}$ is the modulation frequency and n is an integer number which relates to phase ambiguity.

Scene or Camera Changes

The arctan term of equations (12-14) relies on the assumption that neither the scene nor the camera has changed when the four correlations were measured. For instance, in the case that $\varphi$ is constant, and $A_S$ increases by a constant $\Delta A_S$ between correlations taken with 0°, 90°, 180° and 270° signal shifts, the phase offset error is:

$$\Delta\varphi = \arctan\left(\dfrac{(I + 4\Delta A_S) \cdot \sin\varphi}{(I + 2\Delta A_S) \cdot \cos\varphi}\right) - \varphi \quad \text{(eq. 16)}$$

More precisely, the sequences of correlation measurements in the state of the art have logically been set as follows: A first set of a 0° ($S_{\varphi,I}$) and then of a 90° ($S_{\varphi,Q}$) correlation measurements is taken subsequently, and then a second set of a 180° ($S_{\varphi,\overline{I}}$) and then of a 270° ($S_{\varphi,\overline{Q}}$) correlation measurements is taken subsequently. This is due to ease of linear increase of the offset to go from one phase to the next one; the increase being set according to a single and same offset of 90° each time (requiring one single memory allocated to store the offset).

Figure 4:
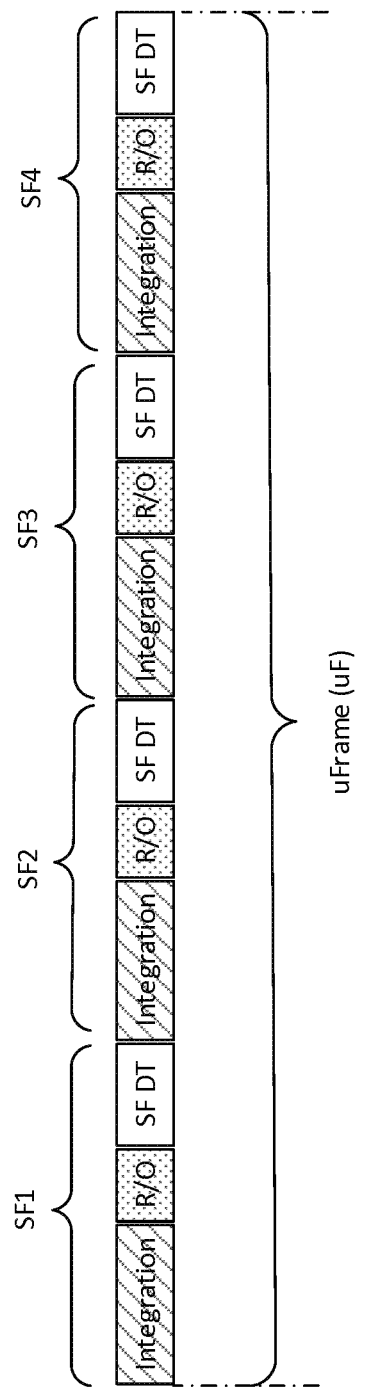
FIG. 4 shows an example of a correlation measurement control sequence.

FIG. 4 shows an example of a correlation measurement control sequence. The control sequence comprises an uFrame uF which comprises four sub-frames SF1, SF2, SF3, and SF4. Each sub-frame relates to a specific correlation measurement with respect to a specific reference signal. According to the state of the art phase-shift sequence, sub-frame SF1 controls a 0° correlation measurement ($S_{\varphi,I}$), sub-frame SF2 controls a 90° correlation measurement ($S_{\varphi,Q}$), sub-frame SF3 controls a 180° correlation measurement ($S_{\varphi,\overline{I}}$), and sub-frame SF4 controls a 270° correlation measurement ($S_{\varphi,\overline{Q}}$).

Each sub-frame comprises an integration sequence, during which the correlation signal is received and integrated. The integration sequence is followed by a R/O sequence, during which the integration result is read out. An R/O sequence is followed by an SF DT sequence, by which the sub-frame ends. DT is a Sub Frame Down Time, during which nothing happens.

Figure 5:
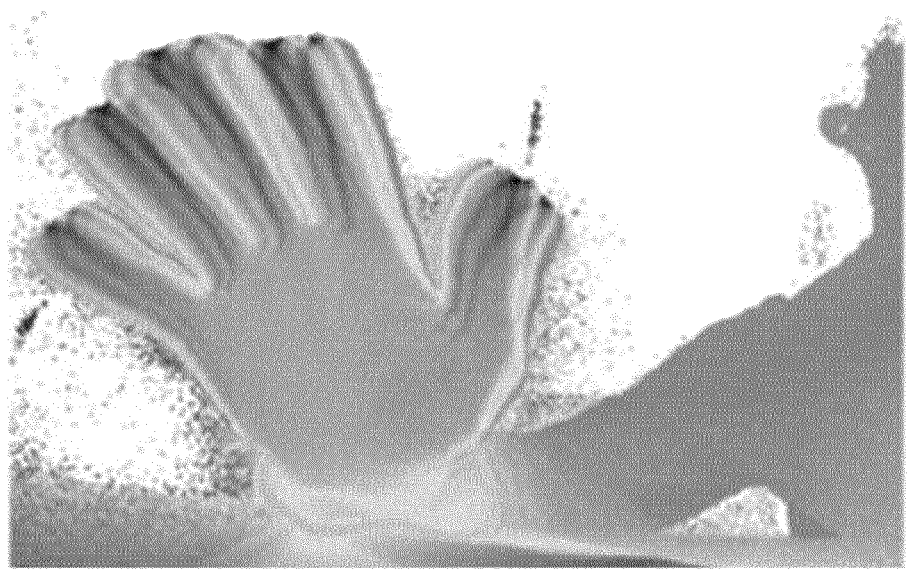
FIG. 5 shows a ToF 3D example image provided by the state of the art phase-shift sequence and that shows substantial motion blur.

FIG. 5 shows a ToF 3D example image provided by the state of the art phase-shift sequence. As this ToF 3D image has been obtained when a user moves the hand before the ToF 3D camera, the ToF 3D image shows significant motion blur.

The embodiments described below relate to an advantageous arrangement of the acquisition over the time, said arrangement enabling the minimization of depth computation errors when estimated as from the ToF principle. They more precisely relate to reordering the signal shifts so that the phase error is reduced.

The arrangement is such that the mean time of acquisition of correlations used in the numerator (in eqs. 12-14 that describe the phase-shift angle φ) and the mean time of acquisition of correlations in the denominator (in the eqs. 12-14 that describe the phase-shift angle φ) are equal.

For quadrature modulations like the ones described, this means that the first and last 3D pictures are taken on 180° opposing phase, and the second and third ones also, for instance in the improved phase-shift hereunder.

Figure 6:
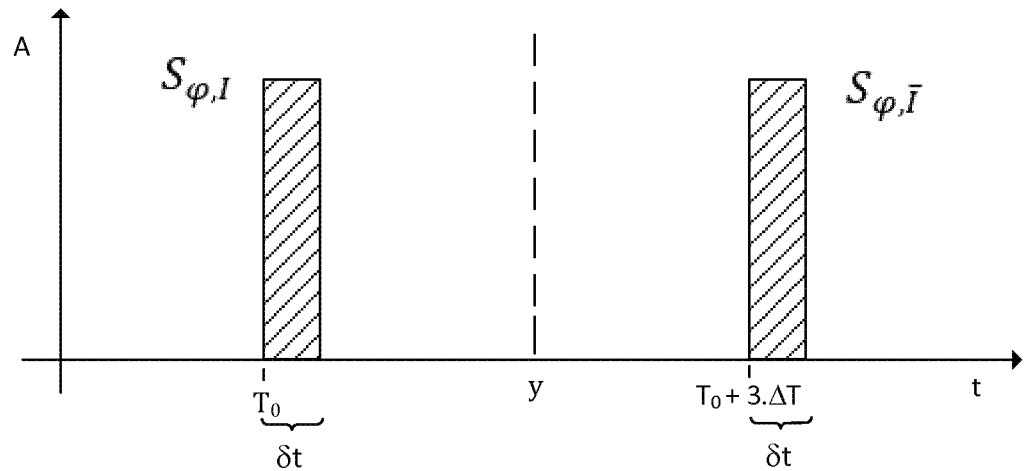
FIG. 6 schematically shows an example of how the mean time of acquisition is determined for the numerator Q and denominator I.
Figure 6:
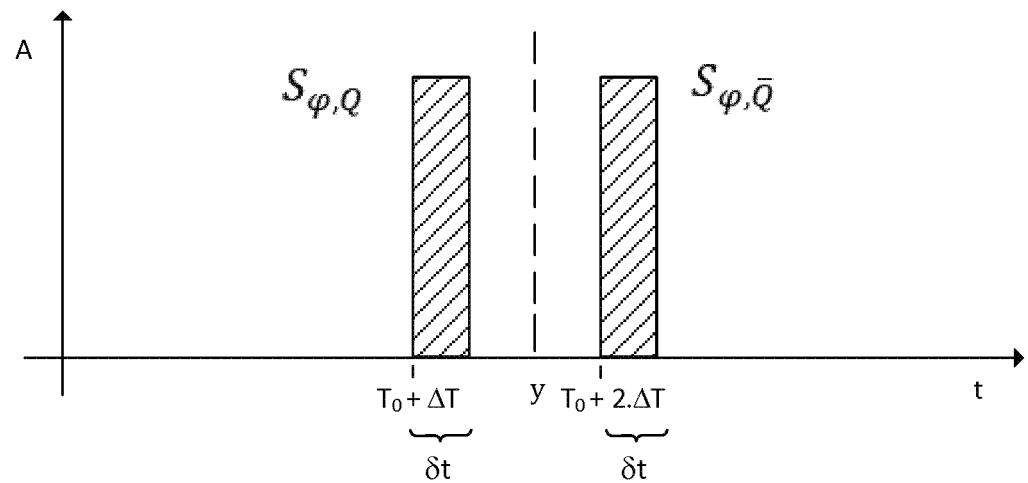

FIG. 6 schematically shows an example of how the mean time of acquisition is determined for the numerator Q and denominator I in eqs. 12-14 when using the phase-shift sequence 0° ($S_{\varphi,I}$), 90° ($S_{\varphi,Q}$), 270° ($S_{\varphi,\bar{Q}}$), 180° ($S_{\varphi,\bar{I}}$) of an embodiment of the invention. The lower graph of FIG. 6 shows the acquisition of the correlation signals $S_{\varphi,Q}$ and $S_{\varphi,\bar{Q}}$ (quadrature correlations) for the numerator Q in eqs. 12-14 as signal amplitude A over time t. Correspondingly, the upper graph of FIG. 6 shows the acquisition of the correlation signals $S_{\varphi,I}$ and $S_{\varphi,\bar{I}}$ (in-phase correlations) for the denominator I in eqs. 12-14 as signal amplitude A over time t. The acquisition of correlation signal $S_{\varphi,I}$ starts at time $T_0$ and lasts for an integration time δt, the acquisition of correlation signal $S_{\varphi,Q}$ starts at time $T_0+\Delta T$ and lasts for an integration time δt, the acquisition of correlation signal $S_{\varphi,\bar{Q}}$ starts at time $T_0+2\cdot\Delta T$ and lasts for an integration time δt, and the acquisition of correlation signal $S_{\varphi,\bar{I}}$ starts at time $T_0+3\cdot\Delta T$ and lasts for an integration time δt. It is assumed here for the sake of example that the integration time δt and the signal amplitude $A(t)=A_0$ is the same for each correlation measurement. The mean time of acquisition $y_Q$ for the nominator correlations $S_{\varphi,Q}$ and $S_{\varphi,\bar{Q}}$ thus is $$y_Q = \frac{\int A(t)\cdot t\cdot dt}{\int A(t)\cdot dt} = T_0 + 1/2\Delta T + 1/2\delta t.$$

Accordingly, the mean time of acquisition $y_I$ for the denominator correlations $S_{\varphi,I}$ and $S_{\varphi,\bar{I}}$ is $$y_I = \frac{\int A(t)\cdot t\cdot dt}{\int A(t)\cdot dt} = T_0 + 1/2\Delta T + 1/2\delta t.$$

That is, with the phase-shift sequence of the example of FIG. 6, the mean time of acquisition $y_Q$ for the nominator correlations $S_{\varphi,Q}$ and $S_{\varphi,\bar{Q}}$ (quadrature correlations) and the mean time of acquisition $y_I$ for the denominator correlations $S_{\varphi,I}$ and $S_{\varphi,\bar{I}}$ (in-phase correlations) is the same.

As in the embodiment of FIG. 6 it is assumed that the integration time δt and the signal amplitude $A(t)=A_0$ is the same for each correlation measurement, the mean time of acquisition $y_Q$ for the nominator correlations (quadrature correlations) and the mean time of acquisition $y_I$ for the denominator correlations (in-phase correlations) are exactly the same. In other practical examples, the amplitudes A, the time intervals ΔT and the integration period δt must not be identical for each correlation measurement. In such cases the mean time of acquisition $y_Q$ of the nominator correlations (quadrature correlations) and the mean time of acquisition $y_I$ for the denominator correlations (in-phase correlations) must not be exactly the same. It is sufficient that they are substantially the same.

The above-described phase-shift sequence of the first embodiment as compared with the phase-shift sequence of the state of the art is displayed in the following table.

| Picture | Time | I | Phase-shift sequence of the State of the Art | Phase-shift sequence according to first embodiment |
|---|---|---|---|---|
| 0 | $T_0$ | $A_S$ | 0° | 0° |
| 1 | $T_0 + \Delta T$ | $A_S + \Delta A_S$ | 90° | 90° |
| 2 | $T_0 + 2\cdot\Delta T$ | $A_S + 2\cdot\Delta A_S$ | 180° | 270° |
| 3 | $T_0 + 3\cdot\Delta T$ | $A_S + 3\cdot\Delta A_S$ | 270° | 180° |

This order, for instance, transforms equation 16 into equation 17 shown hereafter, which shows the error on the phase has been reduced to 0.

$$\Delta\varphi = \arctan\left(\frac{(I+3\Delta A_S)\cdot\sin\varphi}{(I+3\Delta A_S)\cdot\cos\varphi}\right) - \varphi = 0 \quad \text{(eq. 17)}$$

Further phase-shift sequences of other embodiments are displayed in the table below, where phase-shift sequence A is the same as the one described in the table above:

| | Phase-shift sequence | | | | | | | |
|---|---|---|---|---|---|---|---|---|
| Picture | A | B | C | D | E | F | G | H |
| 0 | 0° | 0° | 180° | 180° | 90° | 90° | 270° | 270° |
| 1 | 90° | 270° | 90° | 270° | 0° | 180° | 0° | 180° |
| 2 | 270° | 90° | 270° | 90° | 180° | 0° | 180° | 0° |
| 3 | 180° | 180° | 0° | 0° | 270° | 270° | 90° | 90° |

According to the phase-shift sequences above, a first and a last correlation signal are acquired on 180° opposing phase, and a second and third correlation signal are also acquired on 180° opposing phase.

According to yet other embodiments the correlation signals must not necessarily be in-phase or quadratic to the emitted signal. For example, all phases of the correlation signals can be shifted by the same angle δ so that the difference between them remains the same, and the beneficial effects of the embodiments are still obtained. For example, instead of the phase-shift sequence A: 0°, 90°, 270°, 180°, the phase-shift sequence A': 0°+δ, 90°+δ, 270°+δ, 180°+δ can be used without departing from the gist of the embodiments.

According to these embodiments, the average phase of the phase-shifted quadrature correlation signals and the average phase of the phase-shifted in-phase correlation signals are orthogonal to each other. For example, according to phase-shift sequence A' above, the average value of the shifted in-phase correlation signals 0°+δ, 180°+δ is 90°+δ and the average value of the shifted quadrature correlation signals 90°+δ, 270°+δ is 180°+δ. That is, the average value 90°+δ of the shifted in-phase correlation signals and the average value 180°+δ of the shifted quadrature correlation signals are orthogonal to each other (|(180°+δ)−(90°+δ)|=90°).

According to such embodiments, where all phases of the correlation signals are shifted by the same angle δ, equation (16) takes the following form:

$$\Delta\varphi = \arctan\left(\frac{(I+4\Delta A_S)\cdot\sin(\varphi-\delta)}{(I+2\Delta A_S)\cdot\cos(\varphi-\delta)}\right) - (\varphi-\delta) \quad \text{(eq. 16')}$$

Phase-shift sequences of yet other embodiments are displayed in the table below:

| | | | Phase-shift sequence | | | | |
|---|---|---|---|---|---|---|---|
| Picture | I | J | K | L | M | N | O | P |
| 0 | 0° | 0° | 120° | 120° | 90° | 90° | 210° | 210° |
| 1 | 90° | 210° | 90° | 210° | 0° | 120° | 0° | 120° |
| 2 | 210° | 90° | 210° | 90° | 120° | 0° | 120° | 0° |
| 3 | 120° | 120° | 0° | 0° | 210° | 210° | 90° | 90° |

Again, all angles can be shifted by the same angle δ so that the difference between them remains the same, and the beneficial effects of the embodiments are still obtained. For example, instead of the phase-shift sequence I 0°, 90°, 210°, 120°, the phase-shift sequence I': 0°+δ, 90°+δ, 210°+δ, 120°+δ can be used without departing from the gist of the embodiments. According to these embodiments, again, the average phase of the phase-shifted quadrature correlation signals and the average phase of the phase-shifted in-phase correlation signals are orthogonal to each other. For example, according to phase-shift sequence I' above, the average value of the shifted in-phase correlation signals 0°+δ, 180°+δ is 90°+δ and the average value of the shifted quadrature correlation signals 90°+δ, 270°+δ is 180°+δ. That is, the average value 90°+δ of the shifted in-phase correlation signals and the average value 180°+δ of the shifted quadrature correlation signals are orthogonal to each other (|(180°+δ)−(90°+δ)|=90°).

According to the phase-shift sequences above, a first and a last correlation signal are acquired on 120° opposing phase, and a second and third correlation signal are also acquired on 120° opposing phase.

According to such embodiments equation (16) takes the following form (which is the same as in eq. 16'):

$$\Delta\varphi = \arctan\left(\frac{(I+4\Delta A_S)\cdot\sin(\varphi-\delta)}{(I+2\Delta A_S)\cdot\cos(\varphi-\delta)}\right) - (\varphi-\delta) \quad \text{(eq. 16'')}$$

In the prior art, one would reduce the errors caused by changes in the scene ("motion blur") by measuring the four correlations as fast as possible to reduce the impact of scene changes or one would use additional signal processing to identify the regions in which motion blur had occurred. The embodiments described above, however, limit the motion blur which induces depth measurement errors in key common cases and reduces it significantly otherwise, without additional computation, and without a modification of the system, but with only modification of the method parameters.

Figure 7:
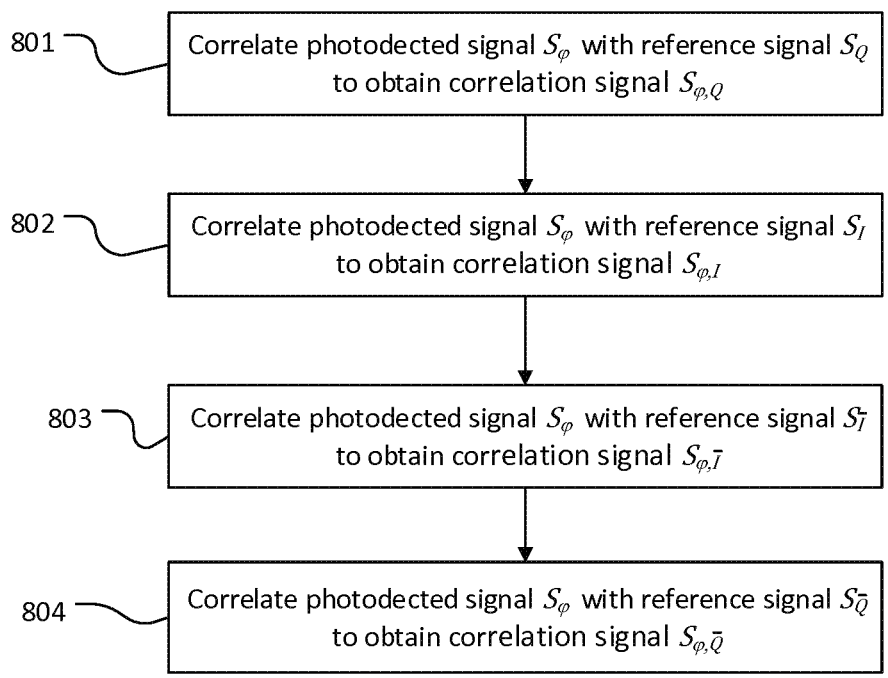
FIG. 7 schematically shows a method of acquiring a ToF image using a phase-shift sequence according to an embodiment of the disclosure.

FIG. 7 schematically shows a method of acquiring a ToF image using a phase-shift sequence according to an embodiment of the disclosure. At 801, a correlation signal $S_{\varphi,Q}$ is acquired by correlating a photodetected signal $S_\varphi$ with a respective phase-shifted reference signal $S_Q$. At 802, a correlation signal $S_{\varphi,I}$ is acquired by correlating a photodetected signal $S_\varphi$ with a respective phase-shifted reference signal $S_\varphi$. At 803, a correlation signal $S_{\varphi,\bar{I}}$ is acquired by correlating a photodetected signal $S_\varphi$ with a respective phase-shifted reference signal $S_{\bar{I}}$. At 804, a correlation signals $S_{\varphi,\bar{Q}}$ is acquired by correlating a photodetected signal $S_\varphi$ with a respective phase-shifted reference signal $S_{\bar{Q}}$. The correlation signals $S_{\varphi,Q}$, $S_{\varphi,\bar{Q}}$, $S_{\varphi,I}$, $S_{\varphi,\bar{I}}$ comprise quadrature correlation signals $S_{\varphi,Q}$, $S_{\varphi,\bar{Q}}$ and in-phase correlation signals $S_{\varphi,I}$, $S_{\varphi,\bar{I}}$. The acquiring the correlation signals $S_{\varphi,Q}$, $S_{\varphi,\bar{Q}}$, $S_{\varphi,I}$, $S_{\varphi,\bar{I}}$ is performed in such a way that the mean time of acquisition of the quadrature correlation signals $S_{\varphi,Q}$, $S_{\varphi,\bar{Q}}$ and the mean time of acquisition of the in-phase correlation signals $S_{\varphi,I}$, $S_{\varphi,\bar{I}}$ are substantially equal.

Effect of the Embodiments

Figure 8:
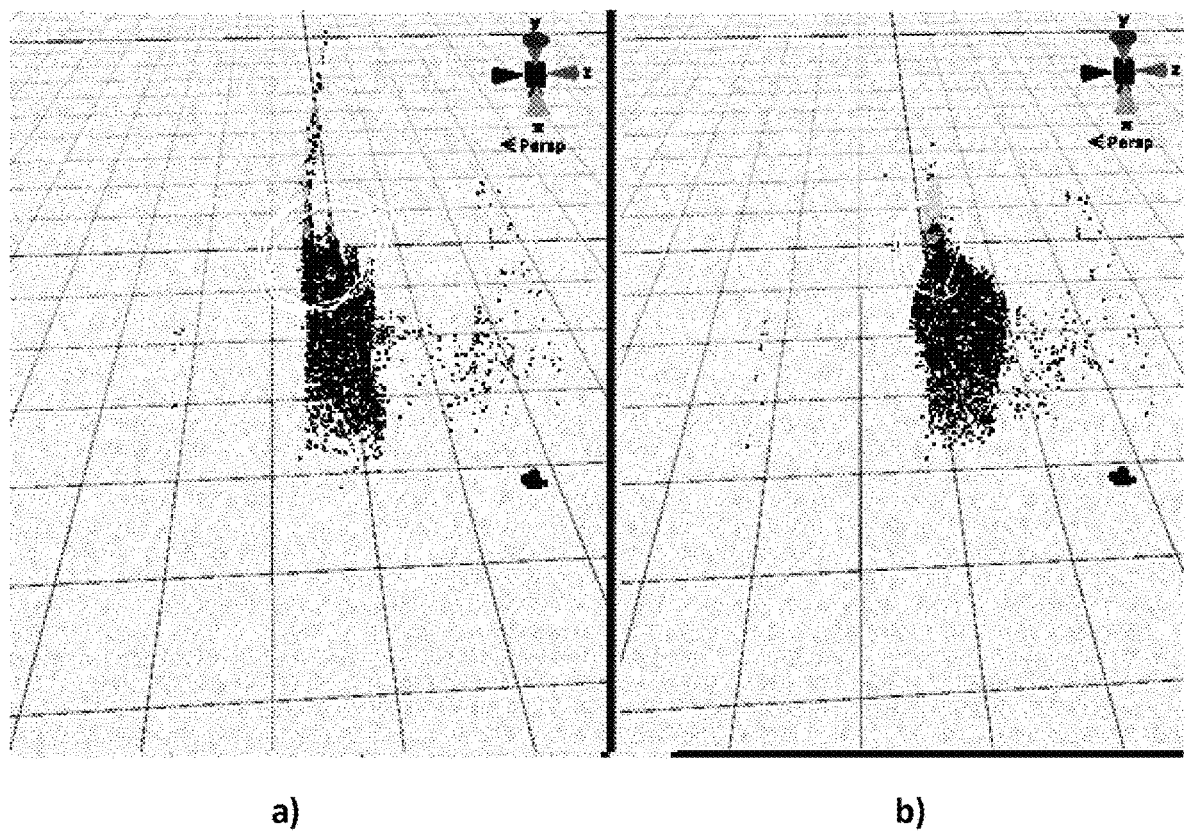
FIG. 8 shows a rear view of a hand with a pointing index finger, the hand performing a circular gesture, with the scene being acquired by a 3D ToF camera located on the top of the hand.

FIG. 8 shows a rear view of a hand with a pointing index finger, the hand performing a circular gesture, with the scene being acquired by a 3D ToF camera located on the top of the hand. The phase difference error computed from the subsequently acquired correlations generates an erroneous depth measurement toward and away from the camera on the Y-axis. The depth measurement error increases with the gradient between a considered pixel and its surrounding pixels. The left image (FIG. 8a) has been obtained with the state of the art phase-shift sequence, and the right image (FIG. 8b) has been obtained with the phase-shift sequence of an embodiment as described above. As can be seen in FIG. 8 the motion blur according to the phase-shift sequence of the embodiment is reduced as compared to the motion blur according to the phase-shift sequence of the prior art.

The embodiments apply to all situations wherein a ToF camera system is to be operated, and in particular wherein motion blur should be minimized and/or system constraints can be relaxed at constant motion blur e.g. moving hand/finger tracking e.g. in a car, moving full body tracking, or 3D object scanning with moving object/camera.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure. That is, the methods as described herein may also be implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

In some of the embodiments described above, quadrature modulated correlation signals with four different correlation signals $S_{\varphi,Q}$, $S_{\varphi,\overline{Q}}$, $S_{\varphi,I}$, $S_{\varphi,\overline{I}}$ are used. The embodiments are, however, not restricted to this specific configuration. For example, in alternative embodiments, more or less than four correlation signals could be used.

Likewise, in some of the embodiments described above, correlation signals $S_{\varphi,Q}$, $S_{\varphi,\overline{Q}}$, $S_{\varphi,I}$, $S_{\varphi,\overline{I}}$ are obtained by correlating a photodetected signal $S_\varphi$ with respective phase-shifted reference signals $S_I$, $S_{\overline{I}}$, $S_Q$ and $S_{\overline{Q}}$ that are phase-shifted by 0°, 180°, 90°, and 270°, respectively, compared to a modulated light signal S. The embodiments are, however, not restricted to this specific configuration. For example, in alternative embodiments, other phase-shifts such as 0°, 90°, 120°, and 270°, or other combinations may be used.

The skilled person will readily appreciate that the disclosure is not limited to the specific processing orders described in the embodiments. For example processing 801 and example 802 in FIG. 7 can be exchanged.

It should be noted that the present technology can also be configured as described below.

(1) An apparatus comprising circuitry configured to:
acquire correlation signals ($S_{\varphi,Q}$, $S_{\varphi,\overline{Q}}$, $S_{\varphi,I}$, $S_{\varphi,\overline{I}}$) by correlating a photodetected signal ($S_\varphi$) with respective phase-shifted reference signals ($S_Q$, $S_{\overline{Q}}$, $S_I$, $S_{\overline{I}}$), the correlation signals ($S_{\varphi,Q}$, $S_{\varphi,\overline{Q}}$, $S_{\varphi,I}$, $S_{\varphi,\overline{I}}$) comprising quadrature correlation signals ($S_{\varphi,Q}$, $S_{\varphi,\overline{Q}}$) and in-phase correlation signals ($S_{\varphi,I}$, $S_{\varphi,\overline{I}}$),
wherein the circuitry is configured in such a way that the mean time of acquisition of the quadrature correlation signals ($S_{\varphi,Q}$, $S_{\varphi,\overline{Q}}$) and the mean time of acquisition of the in-phase correlation signals ($S_{\varphi,I}$, $S_{\varphi,\overline{I}}$) are equal or substantially equal.

(2) The apparatus of (1), wherein the processor is configured to acquire the correlation signals ($S_{\varphi,Q}$, $S_{\varphi,\overline{Q}}$, $S_{\varphi,I}$, $S_{\varphi,\overline{I}}$) according to any one of the phase-shift sequences (A-H):

| Phase-shift sequence | | | | | | | |
|---|---|---|---|---|---|---|---|
| A | B | C | D | E | F | G | H |
| $S_{\varphi,Q}$ | $S_{\varphi,Q}$ | $S_{\varphi,\overline{Q}}$ | $S_{\varphi,\overline{Q}}$ | $S_{\varphi,I}$ | $S_{\varphi,I}$ | $S_{\varphi,\overline{I}}$ | $S_{\varphi,\overline{I}}$ |
| $S_{\varphi,I}$ | $S_{\varphi,\overline{I}}$ | $S_{\varphi,I}$ | $S_{\varphi,\overline{I}}$ | $S_{\varphi,Q}$ | $S_{\varphi,\overline{Q}}$ | $S_{\varphi,Q}$ | $S_{\varphi,\overline{Q}}$ |
| $S_{\varphi,\overline{I}}$ | $S_{\varphi,I}$ | $S_{\varphi,\overline{I}}$ | $S_{\varphi,I}$ | $S_{\varphi,\overline{Q}}$ | $S_{\varphi,Q}$ | $S_{\varphi,\overline{Q}}$ | $S_{\varphi,Q}$ |
| $S_{\varphi,\overline{Q}}$ | $S_{\varphi,\overline{Q}}$ | $S_{\varphi,Q}$ | $S_{\varphi,Q}$ | $S_{\varphi,\overline{I}}$ | $S_{\varphi,\overline{I}}$ | $S_{\varphi,I}$ | $S_{\varphi,I}$ |

(3) The apparatus of (1) or (2), wherein the reference signals ($S_I$, $S_Q$, $S_{\overline{Q}}$, $S_{\overline{I}}$) are phase-shifted by 0°, 90°, 270° and 180° respectively, compared to a modulated light signal (S).

(4) The apparatus of anyone of (1) to (3), wherein the correlation signals are quadrature modulation signals and the circuitry is configured to acquire a first and a last correlation signal on 180° opposing phase, and a second and third correlation signal also on 180° opposing phase.

(5) The apparatus of anyone of (1) to (3), wherein the circuitry is configured to first acquire subsequently a first set of 0° and then of 90° correlation measurements, and then acquire subsequently a second set of 210° and then of 120° correlation measurements.

(6) The apparatus of (3), wherein the circuitry is configured to:
acquire the 0° correlation signal ($S_{\varphi,I}$) at a first time $T_0$,
acquire the 90° correlation signal ($S_{\varphi,Q}$) at a second time $T_0+\Delta T$,
acquire the 270° correlation signal ($S_{\varphi,\overline{Q}}$) at a third time $T_0+2\cdot\Delta T$, and
acquire the 180° correlation signal ($S_{\varphi,\overline{I}}$) at a last time $T_0+3\cdot\Delta T$, where $T_0$ is a time when the acquisition of the correlation signals ($S_{\varphi,Q}$, $S_{\varphi,\overline{Q}}$, $S_{\varphi,I}$, $S_{\varphi,\overline{I}}$) starts, and where $\Delta T$ is a predefined time interval.

(7) The apparatus of anyone of (1) to (4), wherein the processor is configured to acquire the correlation signals ($S_{\varphi,Q}$, $S_{\varphi,\overline{Q}}$, $S_{\varphi,I}$, $S_{\varphi,\overline{I}}$) according to any one of the phase-shift sequences (A-H):

| | Phase-shift sequence | | | | | | | |
|---|---|---|---|---|---|---|---|---|
| Picture | A | B | C | D | E | F | G | H |
| 0 | 0° | 0° | 180° | 180° | 90° | 90° | 270° | 270° |
| 1 | 90° | 270° | 90° | 270° | 0° | 180° | 0° | 180° |
| 2 | 270° | 90° | 270° | 90° | 180° | 0° | 180° | 0° |
| 3 | 180° | 180° | 0° | 0° | 270° | 270° | 90° | 90° |

(8) The apparatus of anyone of (1) to (3), wherein the processor is configured to acquire the correlation signals ($S_{\varphi,Q}$, $S_{\varphi,\overline{Q}}$, $S_{\varphi,I}$, $S_{\varphi,\overline{I}}$) according to any one of the phase-shift sequences (I-P):

| | Phase-shift sequence | | | | | | | |
|---|---|---|---|---|---|---|---|---|
| Picture | I | J | K | L | M | N | O | P |
| 0 | 0° | 0° | 120° | 120° | 90° | 90° | 210° | 210° |
| 1 | 90° | 210° | 90° | 210° | 0° | 120° | 0° | 120° |
| 2 | 210° | 90° | 210° | 90° | 120° | 0° | 120° | 0° |
| 3 | 120° | 120° | 0° | 0° | 210° | 210° | 90° | 90° |

(9) The apparatus of anyone of (1) to (3), further comprising an illumination unit (18) configured to illuminate a scene (24) with a modulated light signal (S).

(10) The apparatus of (1) to (9), further comprising an imaging sensor (1) configured to receive the photodetected signal ($S_\varphi$).

(11) An apparatus comprising circuitry configured to:
acquire correlation signals ($S_{\varphi,Q}$, $S_{\varphi,\overline{Q}}$, $S_{\varphi,I}$, $S_{\varphi,\overline{I}}$) by correlating a photodetected signal ($S_\varphi$) with respective phase-shifted reference signals ($S_Q$, $S_{\overline{Q}}$, $S_I$, $S_{\overline{I}}$), the correlation signals ($S_{\varphi,Q}$, $S_{\varphi,\overline{Q}}$, $S_{\varphi,I}$, $S_{\varphi,\overline{I}}$) comprising a first set of correlation signals ($S_{\varphi,Q}$, $S_{\varphi,\overline{Q}}$) and a second set of correlation signals ($S_{\varphi,I}$, $S_{\varphi,\overline{I}}$),
wherein the circuitry is configured in such a way that the average phase of the first set of correlation signals ($S_{\varphi,Q}$, $S_{\varphi,\overline{Q}}$) and the average phase of the second set of correlation signals ($S_{\varphi,I}$, $S_{\varphi,\overline{I}}$) are orthogonal or substantially orthogonal to each other, and
wherein the circuitry is configured in such a way that the mean time of acquisition of the first set of correlation signals ($S_{\varphi,Q}$, $S_{\varphi,\overline{Q}}$) and the mean time of acquisition of the second set of correlation signals ($S_{\varphi,I}$, $S_{\varphi,\overline{I}}$) are equal or substantially equal.

(12) The apparatus of (11), wherein the first set of correlation signals ($S_{\varphi,Q}$, $S_{\varphi,\overline{Q}}$) comprises quadrature modulation signals and the second set of correlation signal comprises in-phase correlation signals ($S_{\varphi,I}$, $S_{\varphi,\overline{I}}$).

(13) The apparatus of (11) or (12), wherein the first set of correlation signals ($S_{\varphi,Q}$, $S_{\varphi,\overline{Q}}$) comprises quadrature modulation signals that are phase-shifted by a predefined phase angle and the second set of correlation signals comprises in-phase correlation signals ($S_{\varphi,I}$, $S_{\varphi,\overline{I}}$) that are phase-shifted by the predefined phase angle.

(14) The apparatus of anyone of (11) to (13), wherein the processor is configured to acquire the first set of correlation signals ($S_{\varphi,Q}$, $S_{\varphi,\overline{Q}}$) and the second set of correlation signals ($S_{\varphi,I}$, $S_{\varphi,\overline{I}}$) according to any one of the phase-shift sequences (A-H):

| | Phase-shift sequence | | | | | | | |
|---|---|---|---|---|---|---|---|---|
| Picture | A | B | C | D | E | F | G | H |
| 0 | 0° | 0° | 180° | 180° | 90° | 90° | 270° | 270° |
| 1 | 90° | 270° | 90° | 270° | 0° | 180° | 0° | 180° |
| 2 | 270° | 90° | 270° | 90° | 180° | 0° | 180° | 0° |
| 3 | 180° | 180° | 0° | 0° | 270° | 270° | 90° | 90° |

(15) The apparatus of anyone of (11) to (13), wherein the processor is configured to acquire the first set of correlation signals ($S_{\varphi,Q}$, $S_{\varphi,\overline{Q}}$) and the second set of correlation signals ($S_{\varphi,I}$, $S_{\varphi,\overline{I}}$) according to any one of the phase-shift sequences (I-P):

| | Phase-shift sequence | | | | | | | |
|---|---|---|---|---|---|---|---|---|
| Picture | I | J | K | L | M | N | O | P |
| 0 | 0° | 0° | 120° | 120° | 90° | 90° | 210° | 210° |
| 1 | 90° | 210° | 90° | 210° | 0° | 120° | 0° | 120° |
| 2 | 210° | 90° | 210° | 90° | 120° | 0° | 120° | 0° |
| 3 | 120° | 120° | 0° | 0° | 210° | 210° | 90° | 90° |

(16). A method comprising:
  acquiring correlation signals ($S_{\varphi,Q}$, $S_{\varphi,\overline{Q}}$, $S_{\varphi,I}$, $S_{\varphi,\overline{I}}$) by correlating a photodetected signal ($S_\varphi$) with respective phase-shifted reference signals ($S_Q$, $S_{\overline{Q}}$, $S_I$, $S_{\overline{I}}$), the correlation signals ($S_{\varphi,Q}$, $S_{\varphi,\overline{Q}}$, $S_{\varphi,I}$, $S_{\varphi,\overline{I}}$) comprising quadrature correlation signals ($S_{\varphi,Q}$, $S_{\varphi,\overline{Q}}$) and in-phase correlation signals ($S_{\varphi,I}$, $S_{\varphi,\overline{I}}$),
  wherein the acquiring the correlation signals ($S_{\varphi,Q}$, $S_{\varphi,\overline{Q}}$, $S_{\varphi,I}$, $S_{\varphi,\overline{I}}$) is performed in such a way that the mean time of acquisition of the quadrature correlation signals ($S_{\varphi,Q}$, $S_{\varphi,\overline{Q}}$) and the mean time of acquisition of the in-phase correlation signals ($S_{\varphi,I}$, $S_{\varphi,\overline{I}}$) are substantially equal.

(17) A computer program comprising instructions which, when carried out on a processor, cause the processor to perform the method of (16).

(18) A method comprising:
  acquiring correlation signals ($S_{\varphi,Q}$, $S_{\varphi,\overline{Q}}$, $S_{\varphi,I}$, $S_{\varphi,\overline{I}}$) by correlating a photodetected signal ($S_\varphi$) with respective phase-shifted reference signals ($S_Q$, $S_{\overline{Q}}$, $S_I$, $S_{\overline{I}}$), the correlation signals ($S_{\varphi,Q}$, $S_{\varphi,\overline{Q}}$, $S_{\varphi,I}$, $S_{\varphi,\overline{I}}$) comprising a first set of correlation signals ($S_{\varphi,Q}$, $S_{\varphi,\overline{Q}}$) and a second set of correlation signals ($S_{\varphi,I}$, $S_{\varphi,\overline{I}}$),
  wherein the average phase of the first set of correlation signals ($S_{\varphi,Q}$, $S_{\varphi,\overline{Q}}$) and the average phase of the second set of correlation signals ($S_{\varphi,I}$, $S_{\varphi,\overline{I}}$) are orthogonal or substantially orthogonal to each other, and
  wherein the mean time of acquisition of the first set of correlation signals ($S_{\varphi,Q}$, $S_{\varphi,\overline{Q}}$) and the mean time of acquisition of the second set of correlation signals ($S_{\varphi,I}$, $S_{\varphi,\overline{I}}$) are equal or substantially equal.

(19) A computer program comprising instructions which, when carried out on a processor, cause the processor to perform the method of (18).

(20) A computer program comprising instructions which, when carried out on a processor, cause the processor to perform:
  acquiring correlation signals ($S_{\varphi,Q}$, $S_{\varphi,\overline{Q}}$, $S_{\varphi,I}$, $S_{\varphi,\overline{I}}$) by correlating a photodetected signal ($S_\varphi$) with respective phase-shifted reference signals ($S_Q$, $S_{\overline{Q}}$, $S_I$, $S_{\overline{I}}$), the correlation signals ($S_{\varphi,Q}$, $S_{\varphi,\overline{Q}}$, $S_{\varphi,I}$, $S_{\varphi,\overline{I}}$) comprising quadrature correlation signals ($S_{\varphi,Q}$, $S_{\varphi,\overline{Q}}$) and in-phase correlation signals ($S_{\varphi,I}$, $S_{\varphi,\overline{I}}$),
  wherein the acquiring the correlation signals ($S_{\varphi,Q}$, $S_{\varphi,\overline{Q}}$, $S_{\varphi,I}$, $S_{\varphi,\overline{I}}$) is performed in such a way that the mean time of acquisition of the quadrature correlation signals ($S_{\varphi,Q}$, $S_{\varphi,\overline{Q}}$) and the mean time of acquisition of the in-phase correlation signals ($S_{\varphi,I}$, $S_{\varphi,\overline{I}}$) are substantially equal.

(21) A computer program comprising instructions which, when carried out on a processor, cause the processor to perform:
  acquiring correlation signals ($S_{\varphi,Q}$, $S_{\varphi,\overline{Q}}$, $S_{\varphi,I}$, $S_{\varphi,\overline{I}}$) by correlating a photodetected signal ($S_\varphi$) with respective phase-shifted reference signals ($S_Q$, $S_{\overline{Q}}$, $S_I$, $S_{\overline{I}}$), the correlation signals ($S_{\varphi,Q}$, $S_{\varphi,\overline{Q}}$, $S_{\varphi,I}$, $S_{\varphi,\overline{I}}$) comprising a first set of correlation signals ($S_{\varphi,Q}$, $S_{\varphi,\overline{Q}}$) and a second set of correlation signals ($S_{\varphi,I}$, $S_{\varphi,\overline{I}}$),
  wherein the average phase of the first set of correlation signals ($S_{\varphi,Q}$, $S_{\varphi,\overline{Q}}$) and the average phase of the second set of correlation signals ($S_{\varphi,I}$, $S_{\varphi,\overline{I}}$) are orthogonal or substantially orthogonal to each other, and
  wherein the mean time of acquisition of the first set of correlation signals ($S_{\varphi,Q}$, $S_{\varphi,\overline{Q}}$) and the mean time of acquisition of the second set of correlation signals ($S_{\varphi,I}$, $S_{\varphi,\overline{I}}$) are equal or substantially equal.

The invention claimed is:

1. An apparatus comprising circuitry configured to:
acquire correlation signals by correlating a photodetected signal with respective phase-shifted reference signals, the correlation signals comprising quadrature correlation signals and in-phase correlation signals,
wherein the circuitry is configured in such a way that the mean time of acquisition of the quadrature correlation signals and the mean time of acquisition of the in-phase correlation signals are equal or substantially equal;
wherein the reference signals are phase-shifted by 0°, 90°, 270° and 180° respectively, compared to a modulated light signal.

2. The apparatus of claim 1, wherein the processor is configured to acquire the correlation signals according to any one of the phase-shift sequences:

| Phase-shift sequence | | | | | | | |
|---|---|---|---|---|---|---|---|
| A | B | C | D | E | F | G | H |
| $S_{\varphi,Q}$ | $S_{\varphi,Q}$ | $S_{\varphi,\overline{Q}}$ | $S_{\varphi,\overline{Q}}$ | $S_{\varphi,I}$ | $S_{\varphi,I}$ | $S_{\varphi,\overline{I}}$ | $S_{\varphi,\overline{I}}$ |
| $S_{\varphi,I}$ | $S_{\varphi,\overline{I}}$ | $S_{\varphi,I}$ | $S_{\varphi,\overline{I}}$ | $S_{\varphi,Q}$ | $S_{\varphi,\overline{Q}}$ | $S_{\varphi,Q}$ | $S_{\varphi,\overline{Q}}$ |
| $S_{\varphi,\overline{I}}$ | $S_{\varphi,I}$ | $S_{\varphi,\overline{I}}$ | $S_{\varphi,I}$ | $S_{\varphi,\overline{Q}}$ | $S_{\varphi,Q}$ | $S_{\varphi,\overline{Q}}$ | $S_{\varphi,Q}$ |
| $S_{\varphi,\overline{Q}}$ | $S_{\varphi,\overline{Q}}$ | $S_{\varphi,Q}$ | $S_{\varphi,Q}$ | $S_{\varphi,\overline{I}}$ | $S_{\varphi,\overline{I}}$ | $S_{\varphi,I}$ | $S_{\varphi,I}$ |

3. The apparatus of claim 1, wherein the correlation signals are quadrature modulation signals and the circuitry is configured to acquire a first and a last correlation signal on 180° opposing phase, and a second and third correlation signal also on 180° opposing phase.

4. The apparatus of claim 1, wherein the circuitry is configured to first acquire subsequently a first set of 0° and then of 90° correlation measurements, and then acquire subsequently a second set of 210° and then of 120° correlation measurements.

5. The apparatus of claim 3, wherein the circuitry is configured to:
acquire the 0° correlation signal at a first time $T_0$,
acquire the 90° correlation signal at a second time $T_0+T\Delta$,
acquire the 270° correlation signal at a third time $T_0+2\cdot\Delta T$, and
acquire the 180° correlation signal at a last time $T_0+3\cdot\Delta T$, where
$T_0$ is a time when the acquisition of the correlation signals starts, and where $\Delta T$ is a predefined time interval.

6. The apparatus of claim 1, wherein the processor is configured to acquire the correlation signals according to any one of the phase-shift sequences:

| Picture | Phase-shift sequence | | | | | | | |
|---|---|---|---|---|---|---|---|---|
| | A | B | C | D | E | F | G | H |
| 0 | 0° | 0° | 180° | 180° | 90° | 90° | 270° | 270° |
| 1 | 90° | 270° | 90° | 270° | 0° | 180° | 0° | 180° |
| 2 | 270° | 90° | 270° | 90° | 180° | 0° | 180° | 0° |
| 3 | 180° | 180° | 0° | 0° | 270° | 270° | 90° | 90°. |

7. The apparatus of claim 1, wherein the processor is configured to acquire the correlation signals according to any one of the phase-shift sequences:

| Picture | Phase-shift sequence | | | | | | | |
|---|---|---|---|---|---|---|---|---|
| | I | J | K | L | M | N | O | P |
| 0 | 0° | 0° | 120° | 120° | 90° | 90° | 210° | 210° |
| 1 | 90° | 210° | 90° | 210° | 0° | 120° | 0° | 120° |
| 2 | 210° | 90° | 210° | 90° | 120° | 0° | 120° | 0° |
| 3 | 120° | 120° | 0° | 0° | 210° | 210° | 90° | 90°. |

8. The apparatus of claim 1, further comprising an illumination unit configured to illuminate a scene with a modulated light signal.

9. The apparatus of claim 8, further comprising an imaging sensor configured to receive the photodetected signal.

10. An apparatus comprising circuitry configured to:
acquire correlation signals by correlating a photodetected signal with respective phase-shifted reference signals, the correlation signals comprising a first set of correlation signals and a second set of correlation signals,
wherein the reference signals are phase-shifted by at least one of 0°, 90°, 270° and 180° respectively, compared to a modulated light signal,
wherein the circuitry is configured in such a way that the average phase of the first set of correlation signals and the average phase of the second set of correlation signals are orthogonal or substantially orthogonal to each other, and
wherein the circuitry is configured in such a way that the mean time of acquisition of the first set of correlation signals and the mean time of acquisition of the second set of correlation signals are equal or substantially equal.

11. The apparatus of claim 10, wherein the first set of correlation signals comprises quadrature modulation signals and the second set of correlation signal comprises in-phase correlation signals.

12. The apparatus of claim 10, wherein the first set of correlation signals comprises quadrature modulation signals that are phase-shifted by a predefined phase angle and the second set of correlation signals comprises in-phase correlation signals that are phase-shifted by the predefined phase angle.

13. The apparatus of claim 10, wherein the processor is configured to acquire the first set of correlation signals and the second set of correlation signals according to any one of the phase-shift sequences:

| Picture | Phase-shift sequence | | | | | | | |
|---|---|---|---|---|---|---|---|---|
| | A | B | C | D | E | F | G | H |
| 0 | 0° | 0° | 180° | 180° | 90° | 90° | 270° | 270° |
| 1 | 90° | 270° | 90° | 270° | 0° | 180° | 0° | 180° |
| 2 | 270° | 90° | 270° | 90° | 180° | 0° | 180° | 0° |
| 3 | 180° | 180° | 0° | 0° | 270° | 270° | 90° | 90°. |

14. The apparatus of claim 10, wherein the processor is configured to acquire the first set of correlation signals and the second set of correlation signals according to any one of the phase-shift sequences:

| Picture | Phase-shift sequence | | | | | | | |
|---|---|---|---|---|---|---|---|---|
| | I | J | K | L | M | N | O | P |
| 0 | 0° | 0° | 120° | 120° | 90° | 90° | 210° | 210° |
| 1 | 90° | 210° | 90° | 210° | 0° | 120° | 0° | 120° |
| 2 | 210° | 90° | 210° | 90° | 120° | 0° | 120° | 0° |
| 3 | 120° | 120° | 0° | 0° | 210° | 210° | 90° | 90°. |

15. A method comprising:
acquiring correlation signals by correlating a photodetected signal with respective phase-shifted reference signals, the correlation signals comprising quadrature correlation signals and in-phase correlation signals,
wherein the reference signals are phase-shifted by at least one of 0°, 90°, 270° and 180° respectively, compared to a modulated light signal,
wherein the acquiring the correlation signals is performed in such a way that the mean time of acquisition of the quadrature correlation signals and the mean time of acquisition of the in-phase correlation signals are substantially equal.

16. A computer program comprising instructions which, when carried out on a processor, cause the processor to perform the method of claim 15.

17. A method comprising:
acquiring correlation signals by correlating a photodetected signal with respective phase-shifted reference signals, the correlation signals comprising a first set of correlation signals and a second set of correlation signals,
wherein the reference signals are phase-shifted by at least one of 0°, 90°, 270° and 180° respectively, compared to a modulated light signal,
wherein the average phase of the first set of correlation signals and the average phase of the second set of correlation signals are orthogonal or substantially orthogonal to each other, and
wherein the mean time of acquisition of the first set of correlation signals and the mean time of acquisition of the second set of correlation signals are equal or substantially equal.

18. A computer program comprising instructions which, when carried out on a processor, cause the processor to perform the method of claim 17.

* * * * *